US012666334B2

(12) United States Patent
Nader et al.

(10) Patent No.: US 12,666,334 B2
(45) Date of Patent: Jun. 23, 2026

(54) HANDLING OF WIRELESS DEVICES WITHIN A CELL

(71) Applicant: Telefonaktiebolaget LM Ericsson (PUBL), Stockholm (SE)

(72) Inventors: Ali Nader, Malmö (SE); Anteneh Atumo Gebremariam, Malmö (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 660 days.

(21) Appl. No.: 18/006,286

(22) PCT Filed: Jul. 23, 2020

(86) PCT No.: PCT/EP2020/070881
§ 371 (c)(1),
(2) Date: Jan. 20, 2023

(87) PCT Pub. No.: WO2022/017616
PCT Pub. Date: Jan. 27, 2022

(65) Prior Publication Data
US 2023/0262570 A1 Aug. 17, 2023

(51) Int. Cl.
*H04W 36/32* (2009.01)
*H04W 36/08* (2009.01)

(52) U.S. Cl.
CPC ....... *H04W 36/324* (2023.05); *H04W 36/085* (2023.05)

(58) Field of Classification Search
CPC . H04B 7/0617; H04W 36/324; H04W 36/085
See application file for complete search history.

(56) References Cited

U.S. PATENT DOCUMENTS

| | | | |
|---|---|---|---|
| 5,890,067 A * | 3/1999 | Chang | H04W 16/28 455/442 |
| 2006/0189355 A1 | 8/2006 | Cuffaro | |
| 2013/0156010 A1* | 6/2013 | Dinan | H04B 7/0634 370/335 |

(Continued)

FOREIGN PATENT DOCUMENTS

| | | |
|---|---|---|
| GB | 2563932 A | 1/2019 |
| WO | 97 50272 A2 | 12/1997 |

(Continued)

OTHER PUBLICATIONS

3GPP TR 38.803 v14.2.0; 3rd Generation Partnership Project; Technical Specification Group Radio Access Network; Study on new radio access technology; Radio Frequency (RF) and co-existence aspects (Release 14)—Sep. 2017.

(Continued)

*Primary Examiner* — Ji-Hae Yea
(74) *Attorney, Agent, or Firm* — Baker Botts L.L.P.

(57) ABSTRACT

According to an aspect, there is provided a method of operating a first radio access network, RAN, node in a communication network. The first RAN node is configured to serve a plurality of regions of a first cell with respective beams. The method comprises providing a region-specific beam configuration for each of the beams, wherein the region-specific beam configuration for a beam is set according to an expected speed of movement of wireless devices in said region.

20 Claims, 13 Drawing Sheets

(56) References Cited

U.S. PATENT DOCUMENTS

2022/0021444 A1 *    1/2022   Wei ................... H04B 7/06964

FOREIGN PATENT DOCUMENTS

WO           97 50272   A3    12/1997
WO      WO-2019002867 A1 *    1/2019   ............. H04B 7/086

OTHER PUBLICATIONS

PCT International Search Report issued for International application No. PCT/EP2020/070881—Apr. 26, 2021.
PCT International Preliminary Report on Patentability issued for International application No. PCT/EP2020/070881—Oct. 31, 2022.
3GPP TSG-RAN WG2 #106, Reno, USA; Title: Usage of IMU sensor information in the MDT logging; Source: Ericsson (TDoc R2-1906884)—May 13-17, 2019.
PCT Written Opinion of the International Searching Authority issued for International application No. PCT/EP2020/070881—Apr. 26, 2021.

* cited by examiner

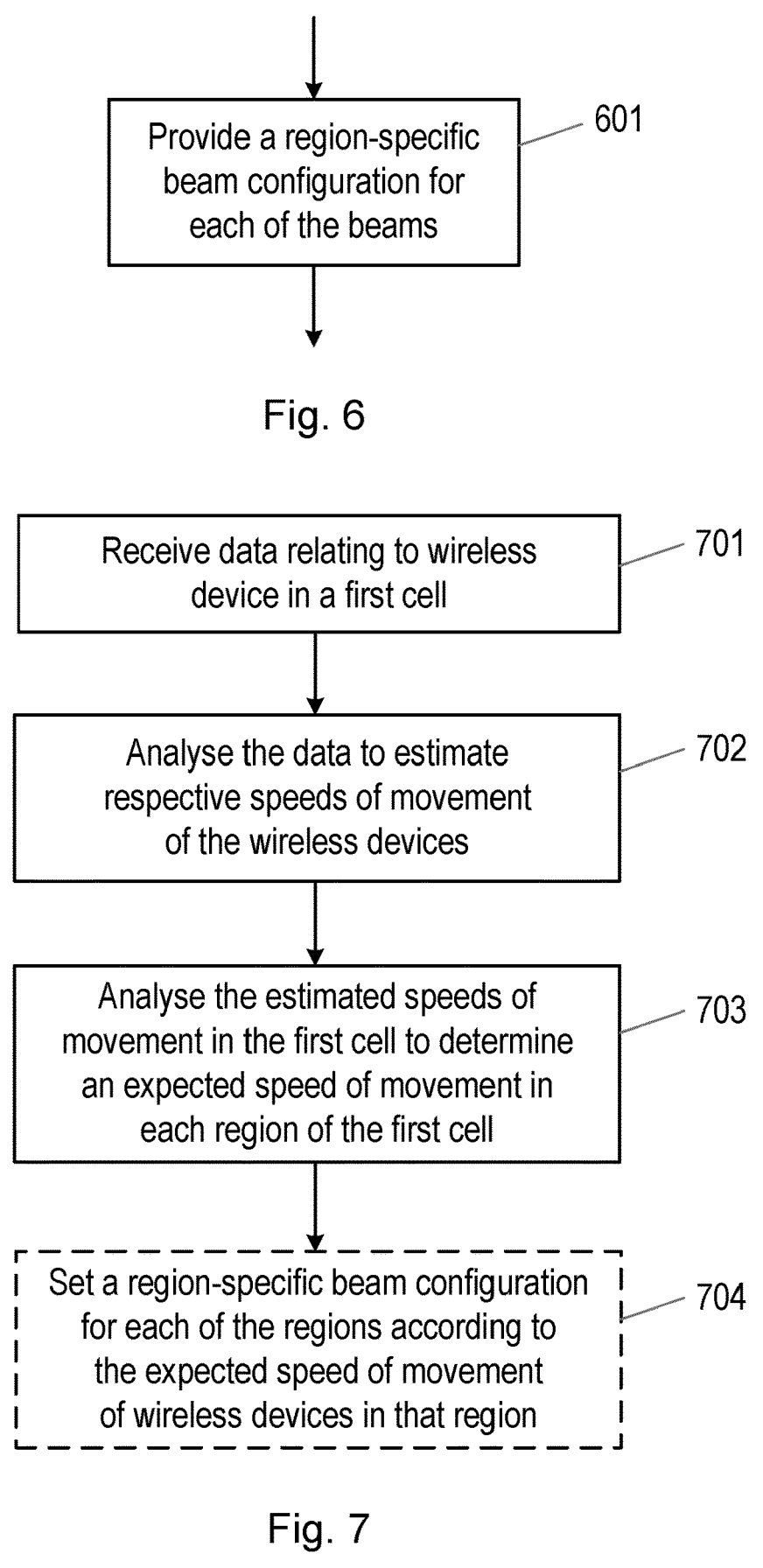

Provide a region-specific
beam configuration for
each of the beams                601

Fig. 6

Receive data relating to wireless
device in a first cell                701

Analyse the data to estimate
respective speeds of movement
of the wireless devices                702

Analyse the estimated speeds of
movement in the first cell to determine
an expected speed of movement in
each region of the first cell                703

Set a region-specific beam configuration
for each of the regions according to
the expected speed of movement
of wireless devices in that region                704

Fig. 7

HANDLING OF WIRELESS DEVICES WITHIN A CELL

PRIORITY

This nonprovisional application is a U.S. National Stage Filing under 35 U.S.C. § 371 of International Patent Application Serial No. PCT/EP2020/070881 filed Jul. 23, 2020 and entitled "Improvements in the Handling of Wireless Devices Within a Cell" which is hereby incorporated by reference in its entirety.

TECHNICAL FIELD

This disclosure relates to a radio access network, RAN, node and a network node for use in a communication network, and in particular to improvements in the handling of wireless devices that are moving at different speeds within a cell.

BACKGROUND

The New Radio (NR) standard in 3GPP (3$^{rd}$ Generation Partnership Project) is being designed to provide service for multiple use cases such as enhanced mobile broadband (eMBB), ultra-reliable and low latency communication (URLLC), and machine type communication (MTC). Each of these services has different technical and mobility requirements. For example, the general requirement for eMBB is a high data rate with moderate latency and moderate coverage, while URLLC services require a low latency and high reliability transmission, but perhaps for moderate data rates. Furthermore, NR is required to serve a mixture of mobility related scenarios for the various types of devices covering both low-speed (e.g. pedestrian), moderate-speed (vehicular), and high-speed up to 500 km/h (high-speed vehicles e.g. high-speed train).

High-speed scenarios lead to challenges in radio communication between the user equipment (UE) and the network (NW); one main challenge being the Doppler spread caused by the relative speed of the UE compared to the NW node (e.g. eNB or gNB).

NR has tools to combat the challenges accommodated with high-speed scenarios. For example, a reference signal (e.g. the Demodulation Reference Signal (DMRS) in NR) used both in the uplink (UL) and the downlink (DL) to estimate the radio channel for demodulation, can be configured differently per UE by the NW for different mobility scenarios. For high-speed scenarios, leading to high Doppler spreads, a configuration with increased time density of the reference signal/DMRS (i.e. transmitted more frequently in time) is more suitable to track fast changes in the radio channel.

Yet another example is the configuration of the preamble formats used for UE initial access to the NW. To avoid a faulty interpretation of the preambles received by the NW in a high-speed scenario deployment, broadcast configurations can configure specific formats (e.g. preamble format 3) and/or put restrictions on the set of cyclic shifts applicable to different preamble formats to be used by the UEs. However, broadcast configurations are not tailored on a UE basis. That is, as the same configuration is broadcast to all UEs in the cell, and it is typically a one-configuration-suits-all type of configuration.

Although in NR the NW has the tools/configuration ability to combat challenges with high-speed UEs, it is not straightforward for the NW to know what configuration (e.g.

a UE-specific configuration or a broadcast configuration) is suitable for a UE upon connection establishment to a node. There is not one configuration that is suitable/optimal for all scenarios. For example a dense DMRS pattern as mentioned above steals resources (i.e. occupies resource elements) that could have otherwise been used for data transfer. That is, for a low-speed UE in need of high data rates, DMRS with a low density in the time domain is preferred. Even though DMRS configurations are UE specific (i.e. provided to a UE in dedicated messages), it is not straightforward for the NW to know what initial configuration should be provided to the UE already during the initial connection establishment via configuration in MSG4. Obviously from a NW vendor point of view, where performance measurements are highly important, a NW configuration with low-density DMRS is preferably provided early (part of MSG4 configuration) so that high data rate communication takes place as soon as possible. However, if it is then detected that the UE is in a high-speed scenario (e.g. estimated based on timing advance or any other means known in the art), a Radio Resource Control (RRC) Reconfiguration is necessary to change the DMRS pattern, but there is a high risk that such a RRC Reconfiguration procedure involving multiple messages back and forth between the UE and NW will fail in high-speed scenarios.

Typically, in existing technology, upon deployment of a cell, it is decided whether the cell is going to cover an area with high-speed/moderate-speed users. Such a configuration is quite rigid and, for example, does not suit a rural environment with a larger and continuous wide area coverage that is required to support a mixture of different UEs of different mobility speeds (e.g. pedestrian, vehicular, and high-speed vehicular).

Therefore there is a need for improvements in the handling of wireless devices that are moving at different speeds within a cell.

SUMMARY

In a 5G network, a base station (e.g. gNB) manages a cell by sequentially transmitting signals in a series of directions from the base station. Each direction is referred to as a 'beam' and covers a respective region (area) of the cell. Thus, the base station transmits a beam in a specific direction at a specific time and then changes the direction by a set amount in the next time frame until the base station has scanned all the regions/areas it should cover. Currently, each beam transmitted by a base station has the same configuration (e.g. all the beams are configured for low speed UEs, or all the beams are configured for high speed UEs).

However, the techniques described herein provide improvements in the handling of wireless devices in a cell by enabling different configurations for the beams of the cell. In particular the configuration for a beam can be set according to an expected speed of movement of wireless devices in a region covered by the beam. In this way, if there are parts of the cells where wireless devices are expected to be moving at high speed (e.g. the beam(s) cover a road or railway line), a beam configuration suitable for fast moving wireless devices can be used, whereas in parts of the cells where wireless devices are expected to be stationary or slow moving (e.g. the beam(s) cover a building or pavement), a beam configuration suitable for slow moving wireless devices can be used.

According to a first specific aspect, there is provided a method of operating a first radio access network, RAN, node in a communication network. The first RAN node is configured to serve a plurality of regions of a first cell with respective beams. The method comprises providing a region-specific beam configuration for each of the beams, wherein the region-specific beam configuration for a beam is set according to an expected speed of movement of wireless devices in said region.

According to a second aspect, there is provided a method of operating a network node to determine respective region-specific beam configurations for a first radio access network, RAN, node in a communication network. The first RAN node is configured to serve a plurality of regions of a first cell with respective beams. The method comprises receiving data relating to wireless devices in the first cell, wherein the data comprises, for each wireless device, measurements by the wireless device of one or more beams of the first cell at a plurality of time instants; analysing the received data to estimate respective speeds of movement of the wireless devices in the first cell based on the measurements of the one or more beams and the time instants at which the measurements were made; analysing the respective estimated speeds of movement of the wireless devices in the first cell to determine an expected speed of movement of wireless devices in each region of the first cell; and setting a region-specific beam configuration for each of the regions, wherein the region-specific beam configuration for a region is set according to the expected speed of movement of wireless devices in that region.

According to a third aspect, there is provided a first radio access network, RAN, node for use in a communication network. The first RAN node is configured to serve a plurality of regions of a first cell with respective beams. The first RAN node is configured to: provide a region-specific beam configuration for each of the beams, wherein the region-specific beam configuration for a beam is set according to an expected speed of movement of wireless devices in said region.

According to a fourth aspect, there is provided a network node for use in determining respective region-specific beam configurations for a first radio access network, RAN, node in a communication network. The first RAN node is configured to serve a plurality of regions of a first cell with respective beams. The network node is configured to: receive data relating to wireless devices in the first cell, wherein the data comprises, for each wireless device, measurements by the wireless device of one or more beams of the first cell at a plurality of time instants; analyse the received data to estimate respective speeds of movement of the wireless devices in the first cell based on the measurements of the one or more beams and the time instants at which the measurements were made; analyse the respective estimated speeds of movement of the wireless devices in the first cell to determine an expected speed of movement of wireless devices in each region of the first cell; and set a region-specific beam configuration for each of the regions, wherein the region-specific beam configuration for a region is set according to the expected speed of movement of wireless devices in that region.

According to a fifth aspect, there is provided a communication system including a host computer and a first radio access network, RAN, node according to the third aspect or any embodiment thereof.

According to a sixth aspect, there is provided a first radio access network, RAN, node for use in a communication network. The first RAN node is configured to serve a plurality of regions of a first cell with respective beams. The first RAN node comprises a processor and a memory, the memory containing instructions executable by said processor whereby said first RAN node is operative to provide a region-specific beam configuration for each of the beams, wherein the region-specific beam configuration for a beam is set according to an expected speed of movement of wireless devices in said region.

According to a seventh aspect, there is provided a network node for use in determining respective region-specific beam configurations for a first radio access network, RAN, node in a communication network. The first RAN node is configured to serve a plurality of regions of a first cell with respective beams. The network node comprises a processor and a memory, the memory containing instructions executable by said processor whereby said network node is operative to: receive data relating to wireless devices in the first cell, wherein the data comprises, for each wireless device, measurements by the wireless device of one or more beams of the first cell at a plurality of time instants; analyse the received data to estimate respective speeds of movement of the wireless devices in the first cell based on the measurements of the one or more beams and the time instants at which the measurements were made; analyse the respective estimated speeds of movement of the wireless devices in the first cell to determine an expected speed of movement of wireless devices in each region of the first cell; and set a region-specific beam configuration for each of the regions, wherein the region-specific beam configuration for a region is set according to the expected speed of movement of wireless devices in that region.

According to an eighth aspect, there is provided a computer program product comprising a computer readable medium having computer readable code embodied therein, the computer readable code being configured such that, on execution by a suitable computer or processor, the computer or processor is caused to perform the method of the first aspect, the second aspect, or any embodiment thereof.

BRIEF DESCRIPTION OF THE DRAWINGS

Some of the embodiments contemplated herein will now be described more fully with reference to the accompanying drawings, in which:

FIG. 6 is a flow chart illustrating a method of operating a RAN node according to various embodiments;

FIG. 7 is a flow chart illustrating a method of operating a network node according to various embodiments;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
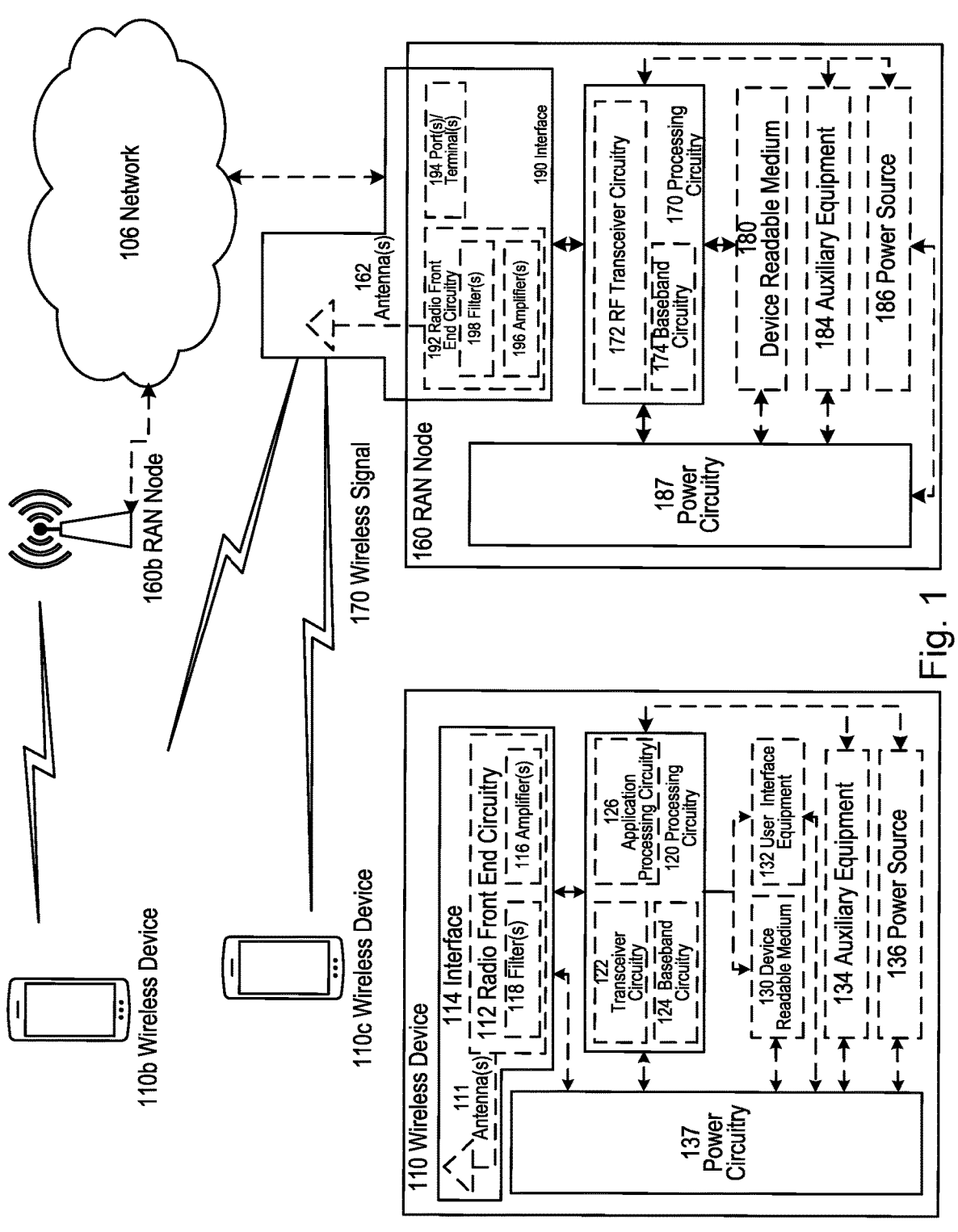
FIG. 1 is a block diagram of a wireless network in accordance with some embodiments.

Although the subject matter described herein may be implemented in any appropriate type of system using any suitable components, the embodiments disclosed herein are described in relation to a wireless (communication) network, such as the example wireless network illustrated in FIG. 1. For simplicity, the wireless network of FIG. 1 only depicts network 106, network nodes 160 in the form of radio access network (RAN) nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g. administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as a machine type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
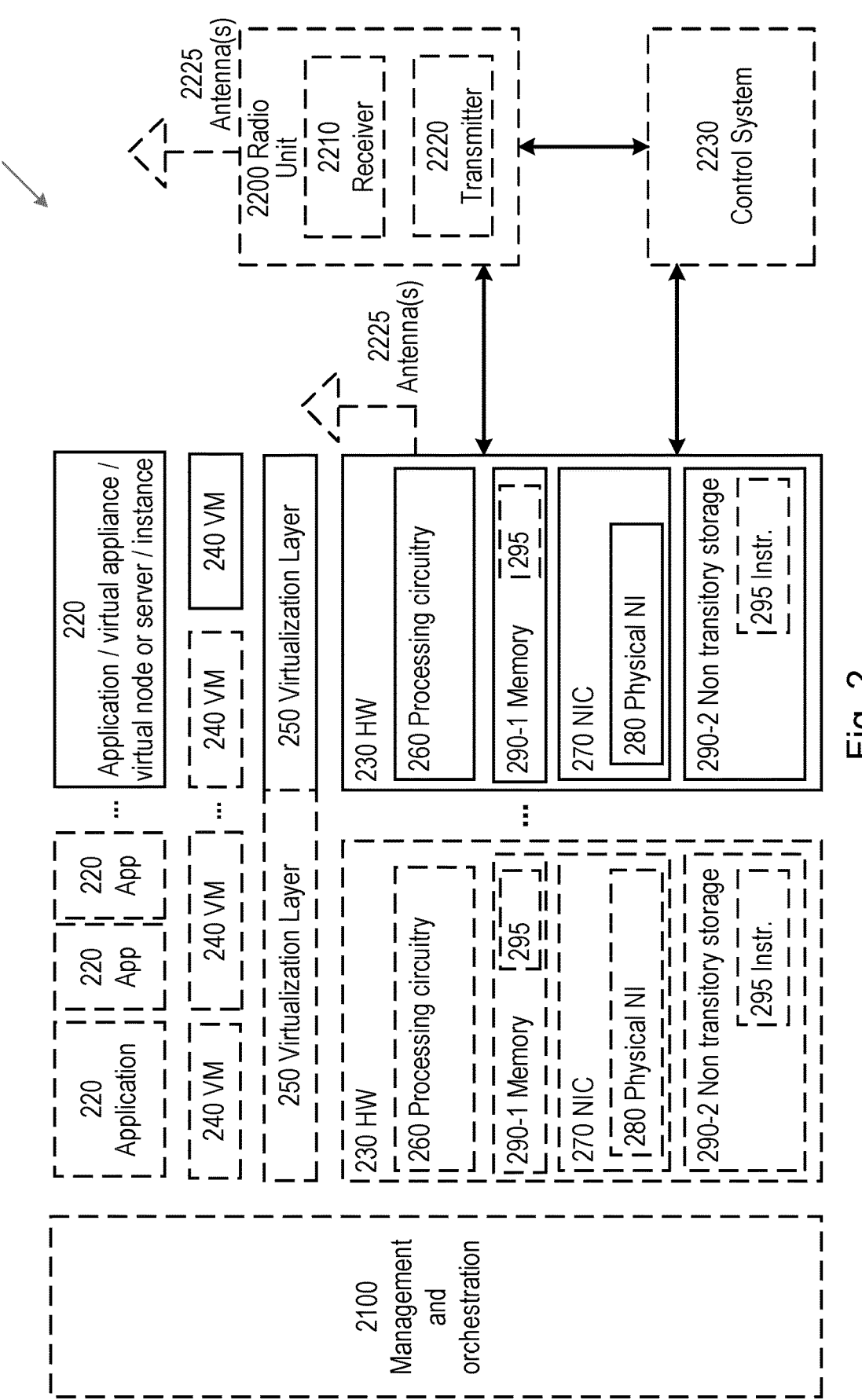
FIG. 2 is a block diagram of a virtualization environment in accordance with some embodiments.

FIG. 2 is a schematic block diagram illustrating a virtualization environment 200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station, a virtualized radio access node or a virtualized network node other than a RAN node or base station) or to a device (e.g., a UE, a wireless device or any other type of communication device) or components thereof and relates to an implementation in which at least a portion of the functionality is implemented as one or more virtual components (e.g. via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 200 hosted by one or more of hardware nodes 230. Further, in embodiments in which the virtual node is not a radio access node or does not require radio connectivity (e.g. a core network node), then the network node may be entirely virtualized.

The functions may be implemented by one or more applications 220 (which may alternatively be called software instances, virtual appliances, network functions, virtual nodes, virtual network functions, etc.) operative to implement some of the features, functions, and/or benefits of some of the embodiments disclosed herein. Applications 220 are run in virtualization environment 200 which provides hardware 230 comprising processing circuitry 260 and memory 290. Memory 290 contains instructions 295 executable by processing circuitry 260 whereby application 220 is operative to provide one or more of the features, benefits, and/or functions disclosed herein.

Virtualization environment 200, comprises general-purpose or special-purpose network hardware devices 230 comprising a set of one or more processors or processing circuitry 260, which may be commercial off-the-shelf (COTS) processors, dedicated Application Specific Integrated Circuits (ASICs), or any other type of processing circuitry including digital or analog hardware components or special purpose processors. Each hardware device may comprise memory 290-1 which may be non-persistent memory for temporarily storing instructions 295 or software executed by processing circuitry 260. Each hardware device may comprise one or more network interface controllers (NICs) 270, also known as network interface cards, which include physical network interface 280. Each hardware device may also include non-transitory, persistent, machine-readable storage media 290-2 having stored therein software 295 and/or instructions executable by processing circuitry 260. Software 295 may include any type of software including software for instantiating one or more virtualization layers 250 (also referred to as hypervisors), software to execute virtual machines 240 as well as software allowing it to execute functions, features and/or benefits described in relation with some embodiments described herein.

Virtual machines 240, comprise virtual processing, virtual memory, virtual networking or interface and virtual storage, and may be run by a corresponding virtualization layer 250 or hypervisor. Different embodiments of the instance of virtual appliance 220 may be implemented on one or more of virtual machines 240, and the implementations may be made in different ways.

During operation, processing circuitry 260 executes software 295 to instantiate the hypervisor or virtualization layer 250, which may sometimes be referred to as a virtual machine monitor (VMM). Virtualization layer 250 may present a virtual operating platform that appears like networking hardware to virtual machine 240.

As shown in FIG. 2, hardware 230 may be a standalone network node with generic or specific components. Hardware 230 may comprise antenna 2225 and may implement some functions via virtualization. Alternatively, hardware 230 may be part of a larger cluster of hardware (e.g. such as in a data center or customer premise equipment (CPE)) where many hardware nodes work together and are managed via management and orchestration (MANO) 2100, which, among others, oversees lifecycle management of applications 220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 240 may be a software implementation of a physical machine that runs programs as if they were executing on a physical, non-virtualized machine. Each of virtual machines 240, and that part of hardware 230 that executes that virtual machine, be it hardware dedicated to that virtual machine and/or hardware shared by that virtual machine with others of the virtual machines 240, forms a separate virtual network elements (VNE).

Still in the context of NFV, Virtual Network Function (VNF) is responsible for handling specific network functions that run in one or more virtual machines 240 on top of hardware networking infrastructure 230 and corresponds to application 220 in FIG. 2.

In some embodiments, one or more radio units 2200 that each include one or more transmitters 2220 and one or more receivers 2210 may be coupled to one or more antennas 2225. Radio units 2200 may communicate directly with hardware nodes 230 via one or more appropriate network interfaces and may be used in combination with the virtual components to provide a virtual node with radio capabilities, such as a radio access node or a base station.

In some embodiments, some signalling can be effected with the use of control system 2230 which may alternatively be used for communication between the hardware nodes 230 and radio units 2200.

Figure 3:
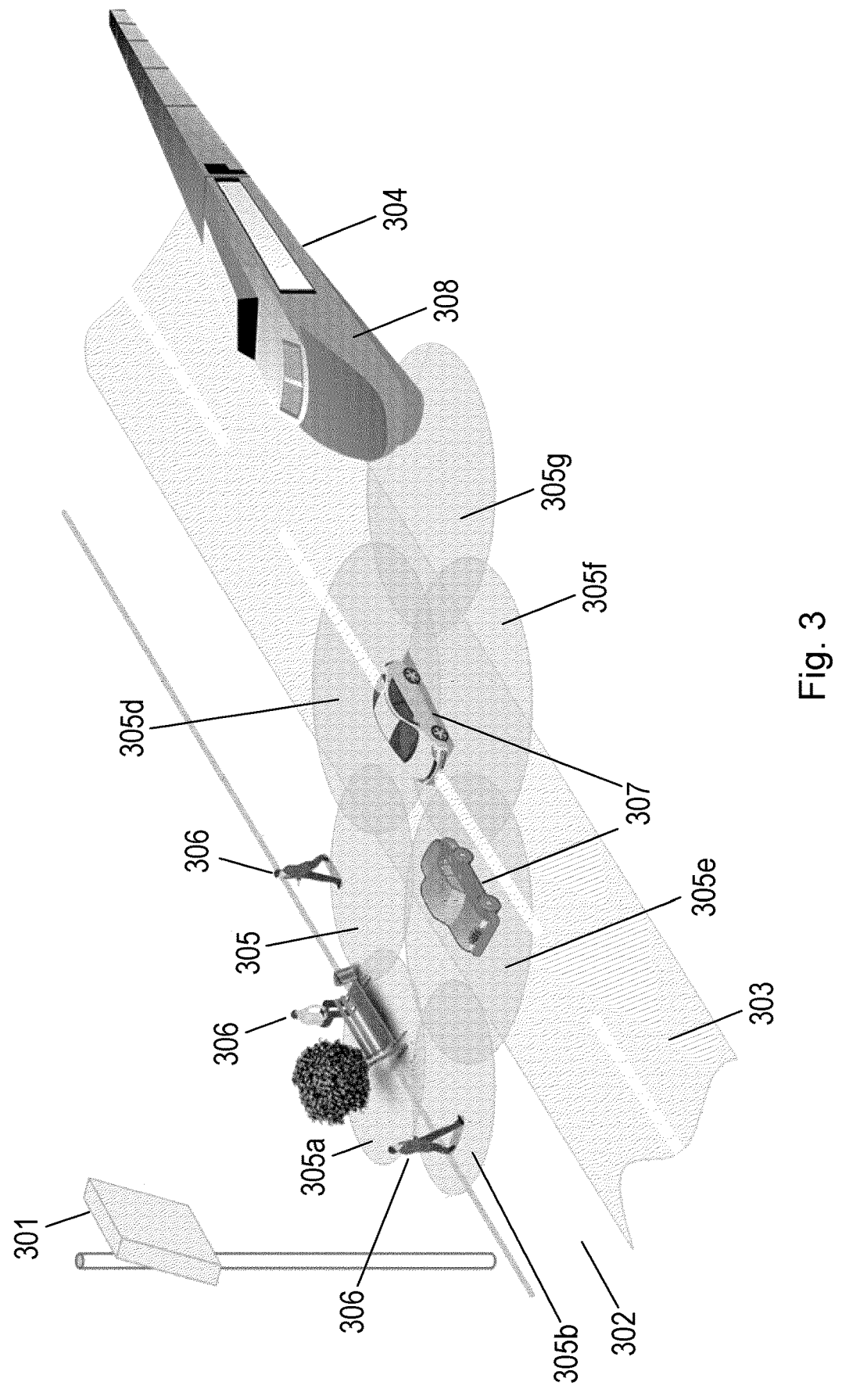
FIG. 3 is a figure illustrating beams for a RAN node located near to a path, road and railway.

As noted above, in a 5G network a base station (e.g. gNB) manages a cell by sequentially transmitting signals in a series of beams in different directions at different times from the base station. Each beam covers a respective part of the cell managed by the base station. It has been realised that different beams may cover areas where the UEs are likely to travel at different speeds. For example some or all of the coverage area/region of one beam may cover a road, whereas some or all of the coverage area/region of another beam may cover a building. This is illustrated in FIG. 3. FIG. 3 is a simplified figure showing a base station (gNB) 301 positioned near to a pavement/pathway 302, a road 303 and a railway line 304. Over time the base station 301 generates a number of beams 305 (respectively labelled 305a-305g) to provide coverage for the base station's cell. Beams 305a, 305b and 305c generally cover a pavement/pathway/seating area 302 that is used by pedestrians 306, and so UE's within the coverage of these beams are likely to be static or slow moving. Beams 305d, 305e and 305f generally cover road 303 and so UEs in vehicles 307 (or the vehicles themselves in the case of so-called 'connected vehicles') within the coverage of these beams may be relatively fast moving. Alternatively if this part of the road 303 is close to a junction, the vehicles/UEs may generally be static or slow moving instead. Beam 305g generally covers railway line 304 and so UEs in a train 308 within the coverage of this beam may be very fast moving. It will be appreciated that FIG. 3 does not show all of the beams generated by the RAN node 301.

In existing systems, the same configuration is statically configured by a network operator for a certain deployment and provided to all the UEs of a cell. In these systems the same configuration is broadcast to RRC_IDLE/INACTIVE UEs and an initial configuration is provided on a UE basis upon connection establishment, e.g. as part of MSG4. The same configuration approach is true even for scenarios where multiple beams are used in the cell as depicted in FIG. 3, i.e. the same contents of the system information is swept/broadcast in the different beams of the same cell.

It has been recognised that it is possible to use different configurations for the beams of the cell, and these configurations can be set according to an expected speed of movement of wireless devices in a region covered by the beam. In this way, it is possible for the base station to tune the configuration to suit UEs with different movement patterns/speeds in different regions of the cell. In some embodiments, a RAN node can dynamically, and on beam level, configure its broadcast and initial UE dedicated beam configurations based on an expected speed of movement rather than a static configuration as mentioned above.

Thus, according to the techniques described herein, in a cell covering a mixture of UEs of different movement patterns (as exemplified in FIG. 3), functionality is implemented that enables a RAN node to tune its configuration to be statistically more optimal (or the most optimal).

(i) In some embodiments, logic can be implemented by the RAN node or another network node (e.g. a node in the core network) that observes, monitors or measures the movement behaviour of the UEs in the cell, or in parts of the cell, with the help of narrow beams (a grid of beams—GOB) in millimeter wave (mmVV) systems without the need for multiple cellular base stations and without assistance from UE-based Global Navigation Satellite System (GNSS) receivers, such as GPS, GLO-NASS, Galileo, etc. (although in some embodiments UE-based GNSS measurements can also or alternatively be utilised). In this way a single 5G NR base station (gNB) can be used to estimate the UE speed with a reasonable precision. The estimation of the UE direction of movement and speed can be based on the constellation (arrangement) of the GOB, which can be assisted by any combination of the following parameters:

Beam indices (serving wide and narrow beams);

A UE-perceived receiver quality, e.g., Reference Signal Receive Power (RSRP);

Timing Advance (TA).

(ii) In some embodiments, the RAN node or other network node can analyse the UE behaviour during different times of day/week/month to identify and track the expected UE speed behaviour at different times.

(iii) In some embodiments, the RAN node or other network node can derive a probability of a particular UE speed occurring at different hours/days in the cell or regions thereof.

(iv) In some embodiments, the RAN node can provide a beam-specific broadcast configuration that is considered to be the most optimal in the relevant region of the cell covered/served by the beam.

(v) In some embodiments, the RAN node can provide a dedicated beam configuration that is considered to be most optimal for UEs accessing/moving into the cell or regions of the cell (e.g. beams) they access/move into.

(vi) In some embodiments, the RAN node can be configured to inform neighbour cells about which reference signal (e.g. DMRS) configuration is most suitable for a UE being handed over. This can occur, for example, during handover preparation or in setting up a new "leg" in dual connectivity, etc.

The techniques provided herein can provide one or more of the following advantages. One advantage is that the techniques can provide a fast and computationally light estimation of UE speed without the need for GNSS assistance, without additional operations by a UE, and without involvement of multiple gNBs. Another advantage is that an optimal beam configuration can be predicted based on an assumed UE movement pattern, e.g. an optimal DMRS configuration for uplink and downlink transmission for handling the Doppler spread, before the connection is established with the UE. Another advantage is that, rather than having a rigid configuration assumed for a certain area where the cell is deployed, the RAN node can adapt its configuration to the deployment scenario to better serve the requirements of the diverse UE population in the cell, including their speeds of movement. This includes a broadcast configuration for sub-parts of the cell; meaning that instead of having a cell-specific broadcast configuration where the same content is swept over the cell in different beams, the content can instead change during the beam sweep, with each beam having a beam-specific configuration tailored to the statistics for the area the beam covers.

Figure 4:
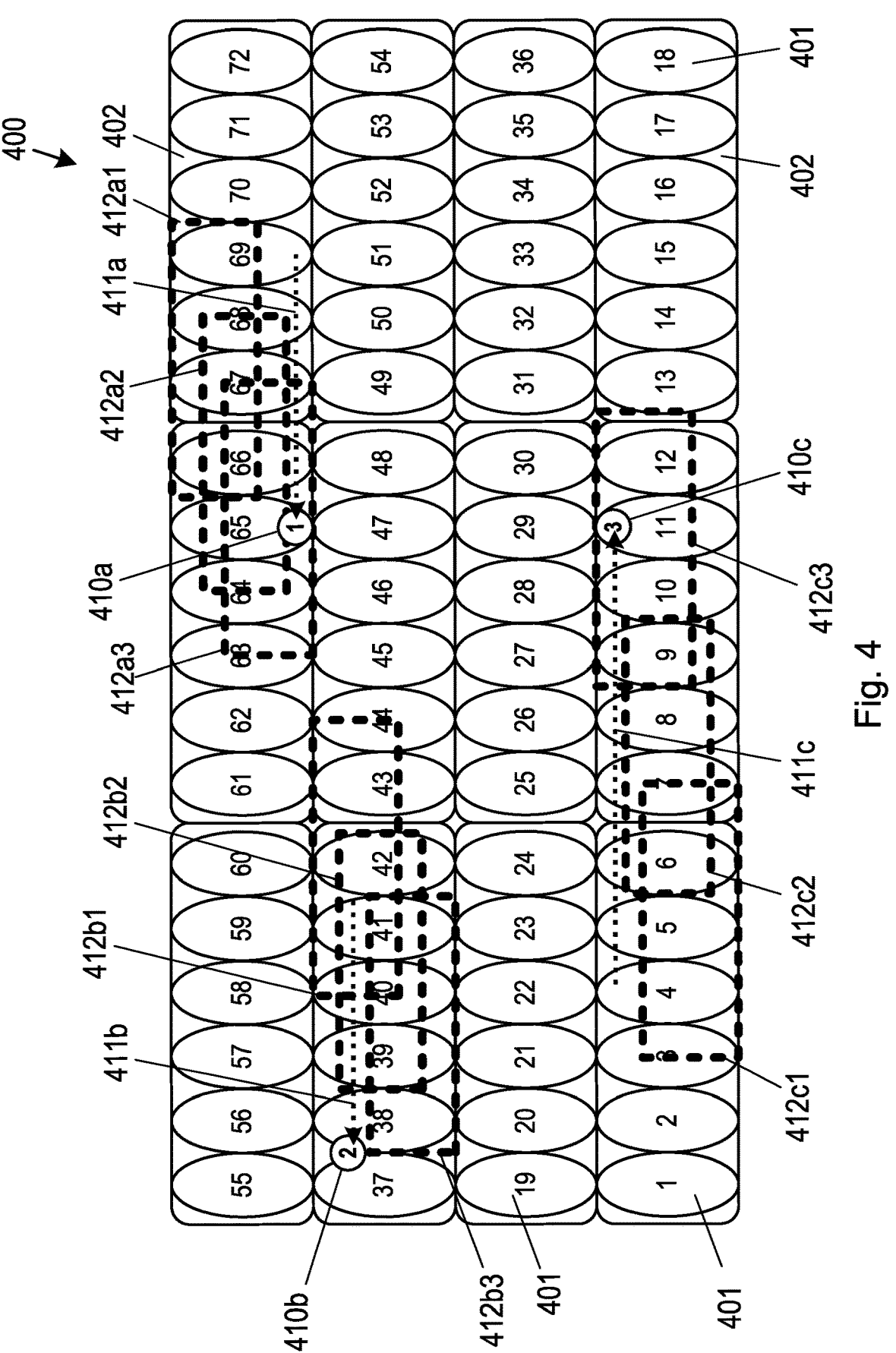
FIG. 4 is an illustration of a Grid of Beams for a RAN node.

For a typical RAN node, the coverage area of the RAN node (the cell) can be considered as a Grid of Beams (GOB), an example of which is shown in FIG. 4. The GOB/cell 400 shown in FIG. 4 effectively represents a 'top-down' view of the coverage area of the RAN node. The GOB 400 comprises a number of narrow beams 401, which are labelled 1 to 72, and a number of wide beams 402. Each beam (narrow and wide) is formed using beamforming techniques, and thus it will be appreciated that each of the beams 401, 402 shown in FIG. 4 represents a region of the cell where the signal for that beam is the strongest or most clear to a UE in that area. It will also be appreciated that the narrower the beam the stronger the signal for the UE when in line of sight (i.e. beam 401 would be stronger than beam 402 for a UE that is in line of sight with beam 401). The RAN node transmits signals in a number of narrow beams and wide beams over time to provide coverage to UEs in the cell. The wide beams 402 are typically used by UEs for gaining initial access to the RAN node, and the narrow beams 401 are typically used for data transfer between the RAN node and the UE. In the example of FIG. 4, the 72 narrow beams 401 are arranged in a rectangular 4×18 grid, and the wide beams 402 are arranged in a 4×3 grid overlapping the 72 narrow beams 401, with each wide beam 402 roughly covering the same area as six narrow beams 401. It will be appreciated that in an actual deployment, the GOB 400 for a RAN node would not typically be a rectangular grid, and may comprise more or less narrow beams 401 and wide beams 402 than shown in FIG. 4.

The discussion below references both FIG. 3 and FIG. 4, and for the purposes of this discussion, FIG. 4 can be considered to represent a GOB 400 generated by RAN node 301. In particular, the RAN node 301 can be considered to be located near to narrow beams 61-66, with the row of narrow beams 55-72 generally covering the pavement/path 302, the rows of narrow beams 37-54 and 19-36 generally covering the road 303, and the row of narrow beams 1-18 generally covering the railway line 304.

The techniques described herein can be considered as comprising training and UE speed estimation phases. In these phases, data is collected about UEs using the cell (such as the beam(s) used, the times that those beams are used, etc.), and this data is analysed to determine the speed of movement of each UE in the cell. The data collection is performed by the RAN node, and the analysis of the data can be performed by the RAN node or by another network node (i.e. a non-RAN node, such as a core network node) in the communication network. The discussion of the training and UE speed estimation phases below is based on the exemplary RAN node shown in FIG. 3 and the exemplary GOB 400 shown in FIG. 4.

Conventionally, UEs periodically perform strength measurements of both narrow and wide beams and report these back to the gNB 301. The techniques described herein make use of these measurements over time to estimate the speed of the UE, and so the UEs are not required to perform any additional functions or operations to enable the techniques described herein. Conventionally, based on the beam strength measurements, the gNB 301 selects the strongest narrow beam (e.g. the narrow beam with the highest RSRP)

as a serving beam for data transmission to/from the UE. In accordance with some embodiments, a UE speed estimator module in the RAN node or other network node determines a mapping between the serving beam indices and the expected speed of the UEs when in the coverage region of that beam.

Some exemplary embodiments for building a database/mapping between UE speed and UE location in the cell as given by the serving narrow beam index (referred to herein as a 'Beam index to expected UE speed' mapping), and the use of the expected UE speeds to adapt individual beam configurations, are discussed below with reference to the process 500 in FIG. 5.

As noted above, FIG. 4 represents a typical coverage area which is divided into 12 wide beams 402 and in each wide beam (WB) 402 there are 6 narrow beams (NB) 401.

In this example, each wide beam 402 occupies 40° in azimuth and 7.5° in elevation direction, whereas the narrow beams occupy 6.67° in azimuth and 7.5° in elevation direction. The narrow beams 401 are indexed from 1 to 72, NB indices 1 to 6 map to WB index 1, NB indices 7 to 12 map to WB index 2 and so on.

It should be appreciated that the analysis described herein is not limited to only narrow beams 401 with the same coverage characteristics (e.g. size) as each other, and the techniques can also be applied to beams having different coverage characteristics. That is, the speed of a UE 410 can be estimated for serving narrow beams 401 having different width(s) either in azimuth and/or elevation direction. For example, a UE 410 served by beam x at time t1, beam y at time (t1+40) ms and z in time (t1+80) ms may be considered to be moving very fast if beams x, y and z are wide beams 402, whereas a UE 410 that is being served by beam q at time t1, beam u at time (t1+40) ms and beam p at time (t1+80) ms is not moving as fast because beam u is narrow, beam p is wide and beam q is very narrow.

The movement of each UE is tracked or associated by the narrow beam indices that it is using to transmit/receive data to/from the gNB 301. As is conventional, each UE is configured to periodically measure the narrow and wide beam strengths and report these measurements back to the gNB 301 in channel state information (CSI) reports, as shown by step 501. These measurements enable tracking of the UE's movement through the cell 400. The CSI report includes the RSRP, and the higher the value of the measured RSRP the more likely that the beam becomes a serving beam for the UE. Given the periodic measurement reporting, then depending on their speed (and the size of the narrow beams 401) each UE may detect and report different sets of narrow beams 401 towards the gNB 301 over time (although not necessarily in each measurement report, given a typical 40 ms measurement periodicity for all the UEs that are being served by the same gNB 301).

Based on each received measurement report, the gNB 301 selects a narrow beam 401 to be the serving beam for each UE, as shown by step 502. Typically, the beam selected is the narrow beam 401 having the best or highest signal strength in the measurement report.

In FIG. 4 three exemplary UEs 410 are shown that are in different regions of the cell 400 and are moving with different speeds through the cell 400. The dotted arrows 411 associated with each UE 410 indicate the direction of movement of the associated UE 410 and the length of the arrow 411 indicates the speed of movement of the associated UE 410 (with shorter arrows 411 corresponding to lower speeds, and longer arrows 411 corresponding to higher speeds). The dashed boxes 412 indicate the narrow beams

401 for which measurements are included in a measurement report at a particular time instant.

In this example, at every beam tracking opportunity (i.e. every 40 ms) the first UE 410*a* (UE1) measures the RSRP of narrow beam indices {66, 67, 68, 69} at a time t1 (indicated by dashed box 412*a*1), narrow beam indices {65, 66, 67, 68} at a time (t1+40) ms (indicated by dashed box 412*a*2) and narrow beam indices {46, 64, 65, 66, 67} at a time (t1+80) ms (indicated by dashed box 412*a*3). Similarly the second UE 410*b* (UE2) reports RSRP measurements for narrow beam indices {40, 41, 42, 43, 60} at time t2 (indicated by dashed box 412*b*1), narrow beam indices {39, 40, 41, 42} at time (t2+40) ms (indicated by dashed box 412*b*2) and narrow beam indices {38, 39, 40, 41} at time (t2+80) ms (indicated by dashed box 412*b*3). The third UE 410*c* (UE3) reports RSRP measurements for narrow beam indices {3, 4, 5, 6} at time t3 (indicated by dashed box 412*c*1), narrow beam indices {6, 7, 8, 9} at time (t3+40) ms (indicated by dashed box 412*c*2) and narrow beam indices {9, 10, 11, 12} at time (t3+80) ms (indicated by dashed box 412*c*3). By comparing the changes in the narrow beam indices reported by each of the UEs 410, it can be seen that the third UE's narrow beam list changes more quickly from report to report compared to the first UE's narrow beam list and the second UE's narrow beam list. If it is assumed that the first UE 410*a*, second UE 410*b* and the third UE 410*c* are generally the same distance from the base station (gNB) 301 and the narrow beams 401 have similar characteristics to each other (e.g. horizontal/vertical direction, beam weights, etc.), then the rate of change of the narrow beam lists indicates that the third UE 410*c* is moving more quickly than the other UEs 410. More generally, if the distance across each of the NBs is known or can be estimated from knowledge of the distance from the UE-base station distance and other beam characteristics, then it is possible to estimate the speed of movement from changes in the narrow beam lists.

It will be noted that the measurement report sent by the first UE 410*a* at time (t1+80) ms includes a measurement of narrow beam 46 and the measurement report sent by the second UE 410*b* at time t2 ms includes a measurement of narrow beam 60 (and narrow beam 60 is selected as the serving beam for the second UE 410*b*). In both cases, these narrow beams 401 were measurable by the respective UE 410 due to signal reflections in the environment.

Table 1 below sets out the above measurement reports for the three UEs 410.

TABLE 1

| UEs | Measurement Periods [ms] | Measured NB indices | Serving NB index | Beam Coverage Area Center (xj, yi) |
|-----|-------------------------|---------------------|------------------|------------------------------------|
| UE1 | t1 | {66, 67, 68, 69} | 68 | (x1, y1) |
|     | t1 + 40 | {65, 66, 67, 68} | 66 | (x2, y2) |
|     | t1 + 80 | {46, 64, 65, 66, 67} | 65 | (x3, y3) |
| UE2 | t2 | {40, 41, 42, 43, 60} | 60 | (x4, y4) |
|     | t2 + 40 | {39, 40, 41, 42} | 40 | (x5, y5) |
|     | t2 + 80 | {38, 39, 40, 41} | 40 | (x6, y6) |
| UE3 | t3 | {3, 4, 5, 6} | 5 | (x7, y7) |
|     | t3 + 40 | {6, 7, 8, 9} | 8 | (x8, y8) |
|     | t3 + 80 | {9, 10, 11, 12} | 11 | (x9, y9) |

Table 1 shows the set of NB indices for which signal measurements were reported in step 501 in a particular measurement report from each UE 410 at the time instants indicated, and the index of the serving narrow beam 401 selected for the UE 410 on the basis of the measurement report in step 502.

A UE speed estimator module 503 (which can be part of the gNB 301 or part of another network node) receives the information in the measurement reports set out in the first three columns of Table 1 and the index of the serving beam for each UE 410 shown in the fourth column (from the left) of Table 1. During the training phase for the beam index to expected UE speed mapping, the UE speed estimator module 503 estimates the speed of movement of each UE from the time series of measurement reports indicating the serving beams over time, and either information on the geographical locations of the serving beams or information on the width of the regions covered by each of the serving beams and/or distance of the region covered by each serving beam from the base station 301.

A first database 504 stores the geographical location information for the various beams 401, 402 in the cell 400 and/or information on the width of the regions covered by each of the serving beams (depending on the embodiment). The following discussion relates to the former embodiment. The geographical location information, which is also referred to as a 'Beam Index to Beam Coverage Area Center' mapping, can be predetermined and relates each beam index to a corresponding physical/geographical region covered by each beam 401/402. In some embodiments, the geographical location information can be the geographical centre of the serving narrow beam 401, and in other embodiments the geographical location information in the cell 400 can correspond to the geographical centre of the set of narrow beams reported in the measurement report.

Thus, the UE speed estimator module 503 obtains the 'Beam Index to Beam Coverage Area Center' mapping (or the relevant parts of the mapping) from the first database 504, and uses the Serving NB Index and this mapping to determine the geographical/spatial location of the UE at the time that the measurements for each measurement report were obtained by the UEs 410. This mapping provides the information in the right-hand column of Table 1, with the geographical/spatial location being represented as x-y coordinates. It will be appreciated that the narrower the narrow beams 401 (in terms of azimuth and/or elevation coverage) the better the accuracy of the Beam Coverage Area Center, and thus the better the estimate of the speed of a UE 410.

The UE speed estimator module 503 can estimate the speed of a particular UE from the time series of measurement reports and the information on the geographical locations of the serving beams of that UE. In particular, the speed can be estimated from the distance travelled by a UE between two measurement reporting periods (i.e., 40 ms). For example, considering the first UE 410*a* between the two measurement intervals t1 and t1+40 ms, the corresponding serving beam indices are beam 68 and 66 respectively. As shown by Table 1, the Beam Coverage Area Center for beam index 68 is given by (x1, y1) and the Beam Coverage Area Center for beam index 66 is (x2, y2). Therefore, the distance travelled by the first UE 410*a* between these measurement reports can be given by:

$$d_{UE1} = \sqrt{(x2 - x1)^2 + (y2 - y1)^2} \text{ [m]} \qquad (1)$$

The estimated speed of the UE is therefore given by:

$$v_{UE1} = \frac{d_{UE1}[m]}{((t1+40)-t1)[ms]} = \frac{d_{UE1}}{40*10^{-3}} * 3.6[km/h] \qquad (2)$$

In an alternative approach, which can be used (for example) where a 'Beam Index to Beam Coverage Area Center' mapping (or equivalent information) is unavailable, the UE speed estimator module 503 can estimate the UE speed of movement based on changes in the serving beam index and/or changes in the measured NB indices in consecutive measurement reports, or across non-consecutive measurement reports, an estimated distance of the UE from the base station (gNB) 301, and the characteristics of the beams. The gNB 301 can estimate how far a UE 410 is from the gNB 301 based on timing advance, which is a time adjustment that a UE should apply to its transmissions so that they better align with the uplink frames at the gNB, and which is dependent on the distance between the UE 410 and the gNB 301. The arrangement of the regions covered by the narrow beams 401 with respect to the base station 301 is known, and so by taking into account the estimated distance of the UE 410 from the base station 301 (which therefore indicates the distance between the narrow beam 401 serving the UE 410 and the base station 301) and beam characteristics, a geographical size of each narrow beam can be estimated. From this, it is possible to estimate a distance travelled by the UE between measurement reports from the changes in serving NB and/or changes in the NBs that can be measured by the UE in each report. The speed of the UE 410 can be calculated from the time between the relevant measurement reports. For example, for the first UE 410a in Table 1, the UE speed estimator module 503 can determine that between the first and third measurement reports, the first UE 410a has covered a distance equivalent to the width of two narrow beams (since in the first measurement report NB indices 66-69 are measured, whereas in the third measurement report NB indices 64-67 are measured—a 'shift' of two NBs). Thus, if the distance across each of the NBs is known or can be estimated from the UE-base station distance (e.g. indicated by the timing advance) and other beam characteristics, the speed of movement can be given by the distance across two NBs divided by the time between the two measurement reports.

During the training phase, the estimated UE speed is stored, along with the relevant serving beam index/ices in a second database 505 that is for storing the beam index to UE speed mapping. It will be appreciated that the estimation of the UE speed can be estimated from consecutive measurement reports, as outlined above. It will also be appreciated that the UE speed can be estimated using equations (1) and (2) from any two measurement reports for that UE.

Figure 5:
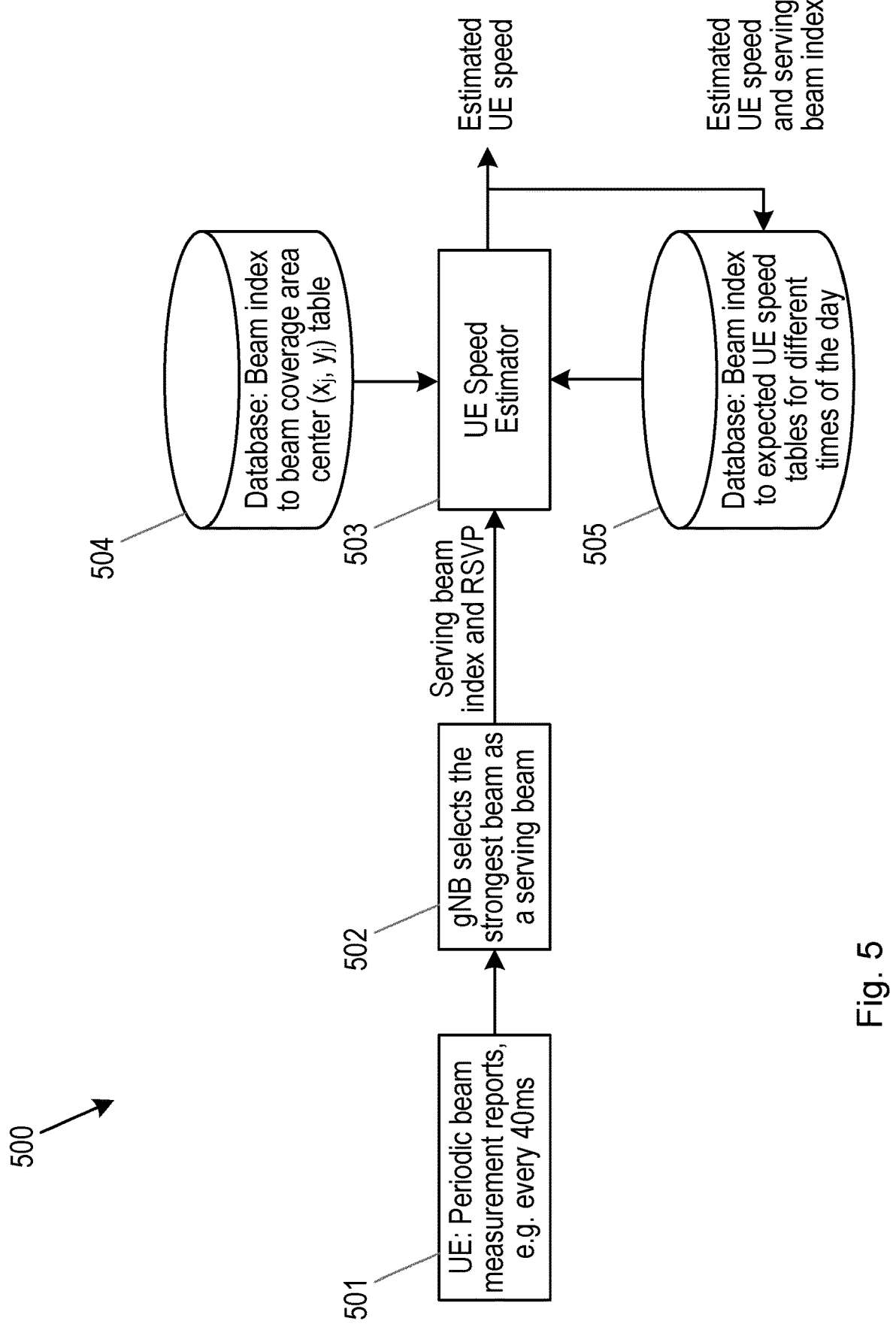
FIG. 5 is a block diagram illustrating a process for determining a mapping between a beam and expected UE speed.

The process in FIG. 5 is repeated for a number of different UEs 410, for different, or all, regions of the cell 400, and at different times of the day and week, and the estimated UE speed and corresponding beam index/ices is stored in the second database 505.

The UE speed estimator module 503 (or alternatively another module in the RAN node 301 or other network node), can evaluate or analyse the information stored in the second database 505 to determine an expected UE speed for each of the narrow beams. This analysis provides the beam index to UE speed mapping, which is stored in the second database 505.

In some embodiments, the analysis can comprise determining the expected UE speed for a particular beam as the average (e.g. mean, mode or median) of all the UE speeds observed in that beam.

It will be appreciated that the typical speed of movement of a UE when in the coverage of a particular beam may vary depending on the time of day (e.g. a UE in a vehicle in a particular beam may move more slowly during rush hour than a UE in that same beam in the middle of the day when vehicle traffic is lighter), and/or between days of the week (e.g. vehicle traffic may be lighter at weekends). Therefore, in some embodiments, the information stored in the second database 505 can be analysed to determine respective mappings for a particular beam corresponding to different times/ day periods.

It should be noted that the exemplary training process in FIG. 5 uses beams of a single cell for the sake of simplicity. As a gNB 301 could host more than a single cell, the training process described above can be extended to multi-cell scenarios. In such a case, information derived from a UE's measurement reports (typically ongoing measurements and reporting on wide beams of neighbour cells when the UE is close to those cells) can be stored in the second database 505 so that the second database 505 includes information about a mixture of the cell's own narrow beams 401 and a neighbouring cell's wide beams 402.

Once expected UE speeds have been determined for the narrow beams 401 in the cell 400, the configurations used by the RAN node 301 for each beam can be adapted to the UE speeds expected in that region of the cell 400. Where different beam index to expected UE speed mappings are determined for different times of the day/week, a different beam configuration for a particular beam can be determined for each of those different times. For example, based on the beams shown in FIG. 3, the beams 305a-c can be configured for slow moving UEs (as the beam index to expected UE speed mapping indicates that UEs in these beams are slow moving), the beams 305d-f can be configured for fast moving UEs (as the beam index to expected UE speed mapping indicates that UEs in these beams are fast moving), and the beam 305g can be configured for very fast moving UEs (as the beam index to expected UE speed mapping indicates that UEs in this beam are very fast moving). The configuration for each beam can be broadcast by the RAN node 301 and/or provided in a dedicated message that is sent to a UE on entering the cell 400 or the coverage region of a particular beam.

Broadly, beams can be configured for different speed UEs by changing the content broadcast in a beam, changing the periodicity with which the beam is broadcast or transmitted, changing a reference signal (e.g. DMRS) and/or CSI reporting rate on connection establishment to a rate that is more suitable for the assumed speed of the UE.

Some examples of different configurations and/or parameters that can be modified or varied in a specific beam configuration are outlined below:

For UEs 410 that are in RRC_CONNECTED mode, there can be a UE-speed-specific Radio Resource Management (RRM) configuration where any of the following are applied or modified:

The rate of measurement reports from the UE 410, whether RRM (L3 measurements) or link monitoring reports (CSI-Reference Signal (RS) reports) can be increased for higher speed regions.

Reference signal (e.g. DMRS) configurations: the reference signal (DMRS in NR) provides some flexibility to cater for different deployment scenarios and use cases. Up to four reference-signal instances per slot can be configured for a UE 410 to support very high-speed scenarios. The initial configuration assumed to be suitable for a UE is adapted to the different regions.

For UEs 410 that are in RRC_IDLE/INACTIVE mode, any of the following broadcast beam configurations can be applied or modified:

The content and rate of provision of system information. For example, system information can be broadcast more often in high-speed regions compared to low-speed regions. This implies that rather than having the same broadcast transmission included in every beam during the beam sweep, instead:

different contents of system information can be transmitted during the sweep; and/or during some sweeps, the system information may not be transmitted in some beams where the UEs are assumed to be moving at a slow rate, leading to more capacity in those beams at those certain occasions.

Although the process in FIG. 5 is referred to as a training process, the FIG. 5 process can be performed continuously during the operation of the RAN node 301, with the beam Index to expected UE speed mapping being updated based on new measurement reports from UEs. In the event that this leads to a change in an expected UE speed for a beam, the corresponding configuration of that beam can be adjusted accordingly. For example, as a result of sudden traffic accident, the RAN node 301 may observe that the majority UEs 410 in the coverage regions of beams 305*d-f* in FIG. 3 are no longer moving at fast speeds, and the configurations of these beams can be adapted to suit low speed or lower speed UEs until the measurement reports again suggest that the UEs 410 in those regions are moving at fast speeds.

While in the techniques described above each RAN node 301 manages its own beam configurations based solely on observations of UEs within its cell 400, in further embodiments certain observations or configurations can be shared between RAN nodes, particularly neighbouring RAN nodes. For example, when a UE is to handover from a source RAN node to a neighbouring target RAN node, the source RAN node can inform the target RAN node about a beam configuration that is most suitable for that UE. This information can be provided by the source RAN node, for example, during handover preparation, or when setting up new "leg" in dual connectivity, etc.

In the above discussion, a beam configuration to use is based on the beam index to expected UE speed mapping. However, in further embodiments, the RAN node 301 might make use of other inputs in addition to the UE's serving beam index to determine a dedicated beam configuration for that UE. For example, the RAN node 301 (or more generally the network) might store information on the most common scenario/behaviour of a UE typical for a certain cell (or parts/regions thereof) at a certain time(s) of the day. Such behaviour can, for example, be stored in the RAN node 301 in a UE's RRC_INACTIVE context, a CN context, or a context external to the 3GPP network and fetched upon connection of the UE 410 to the network or RAN node 301. The beam configuration for this UE 410 may then be adapted to the stored scenario/behaviour information even if this contradicts the beam configuration indicated by the expected UE speed for that serving beam. As a specific example, based on the methods described above, it may be determined or assessed that most UEs on road 303 are moving fast (e.g. say 90% of the UEs are fast moving). So, when a UE 410 connects from a narrow beam 401 covering the road 303, the beam for that UE 410 can be configured with parameters suitable for high-speed UEs. However, during connection it is noted that a particular UE (denoted 'UEx') is actually one of the 10% of UEs that move slowly. Information about this UEx is stored in the network (e.g. in a database). If this happens often enough (e.g. over the course of several hours or days, etc.), UEx can be marked in the database as a UE that deviates from the normal movement pattern for that beam. When UEx subsequently connects from that area (beam) at that time of day, information about UEx is retrieved from the database (information such as UE context, CN context, etc.) and, despite the connection being from an area in which UEs are typically fast moving (e.g. an area including a road), the beam for UEx can be configured for a slow-moving UE.

The flow chart in FIG. 6 illustrates a method of operating a first RAN node according to various embodiments. The first RAN node (e.g. a gNB) is part of a communication network, and serves a plurality of regions of a first cell with respective beams. In step 601 the method comprises providing a region-specific beam configuration for each of the beams. The region-specific beam configuration for a beam is set according to an expected speed of movement of wireless devices in the region. Thus, for example, if wireless devices in a particular region are expected to move with high speed, the beam configuration for that region is set so that it is suitable for wireless devices that are moving with high speed. Likewise, if wireless devices in a particular region are expected to move with low speed, the beam configuration for that region is set so that it is suitable for wireless devices that are moving with low speed.

In some embodiments, the region-specific beam configuration for a wireless device to use with the respective beam can be communicated to the wireless device in one of several different ways. In some embodiments, the configuration is broadcast by the respective beam. In alternative embodiments, the configuration is broadcast in system information in the first cell. In other alternative embodiments, the configuration is comprised in a dedicated message to the wireless device.

A region-specific configuration can comprise one or more of a rate at which a wireless device is to transmit measurement reports to the RAN node when the wireless device is in the region; a reference signal configuration relating to a reference signal used to estimate a radio channel when the wireless device is in the region; a DMRS configuration to be used by the wireless device when in the region; content of SI to be broadcast by the respective beam; and a rate at which SI is to be broadcast by the respective beam.

In some embodiments, wireless devices are expected to move with a speed in a first speed range when in a first subset of the plurality of regions, and wireless devices are expected to move with a speed in a second, higher, speed range when in a second, different, subset of the plurality of regions. In this case the region-specific beam configurations for the beams corresponding to the regions in the first subset can be set according to the expected speeds in the first speed range, and the region-specific beam configurations for the beams corresponding to the regions in the second subset can be set according to the expected speeds in the second speed range. The region-specific beam configurations for the beams corresponding to the regions in the first subset can be different to the region-specific beam configurations for the beams corresponding to the regions in the second subset. In particular, the beam configurations can differ in one or more of a rate at which a wireless device is to transmit measurement reports to the RAN node when the wireless device is in the region; a reference signal configuration relating to a reference signal used to estimate a radio channel when the wireless device is in the region; a DMRS configuration to be used by the wireless device when in the region; content of SI to be broadcast by the respective beam; and a rate at which SI is to be broadcast by the respective beam.

In some embodiments, the method can further comprise receiving behaviour data relating to behaviour of a first wireless device in the first cell. The behaviour data comprises information on previous speed of movement of the first wireless device in one or more regions of the first cell. The information on the previous speed of movement of the first wireless device for each of the one or more regions is compared to the expected speed of movement for each of the one or more regions, and if the previous speed of movement of the first wireless device in a region deviated from the expected speed of movement for that region, an indication can be stored of the previous speed of movement of the first wireless device in that region. Subsequently, when the first wireless device is again in a first region for which an indication is stored, the stored indication of the previous speed of movement of the first wireless device in the first region can be retrieved, and a UE-specific beam configuration is provided for the first wireless device in that region, with beam configuration being set according to the previous speed of movement of the first wireless device in the first region.

In some embodiments, at or during handover of a first wireless device from a second RAN node to the first RAN node, the first RAN node can receive information from the second RAN node indicating a suitable beam configuration for the first wireless device.

In some embodiments, at or during handover of a second wireless device from the first RAN node to a second RAN node, the first RAN node can send information to the second RAN node indicating a suitable beam configuration for the second wireless device.

The flow chart in FIG. 7 illustrates a method of determining an expected speed of movement of wireless devices in a first cell according to various embodiments. In further embodiments, the expected speed of movement can be used to set region-specific beam configurations.

The method of FIG. 7 can be performed prior to step 601. In addition or alternatively, the method of FIG. 7 can be performed after step 601 to update the beam configurations. The method of FIG. 7 can be performed by the first RAN node (e.g. a gNB) in respect of the first cell, and/or by a different network node (e.g. a network node in the core network) in respect of the first cell.

In a first step, step 701, data relating to wireless devices in the first cell is received. The data comprises, for each wireless device, measurements by the wireless device of one or more beams of the first cell at a plurality of time instants.

In step 702, the data is analysed to estimate respective speeds of movement of the wireless devices in the first cell. The speeds of movement are estimated based on the measurements of the one or more beams and the time instants at which the measurements were made.

Finally, in step 703, the respective estimated speeds of movement of the wireless devices in the first cell are analysed to determine an expected speed of movement of wireless devices in each region of the first cell.

Optionally, in step 704, a region-specific beam configuration is set for each of the regions according to the expected speed of movement of wireless devices in that region.

These region-specific beam configurations can subsequently be used in step 601 of FIG. 6.

In some embodiments, step 702 comprises analysing the received data to estimate the respective speeds of movement of the wireless devices in the first cell based on the beam measurements, the time instants at which the measurements were made, and mapping information indicating a geographical location associated with each beam.

In alternative embodiments, step 702 comprises analysing the received data to estimate the respective speeds of movement of the wireless devices in the first cell based on the beam measurements, the time instants at which the measurements were made, information indicating a distance of each wireless device from the first RAN node at the time instants at which the measurements were made and information indicative of the size and/or relative locations of the respective regions.

Figure 8:
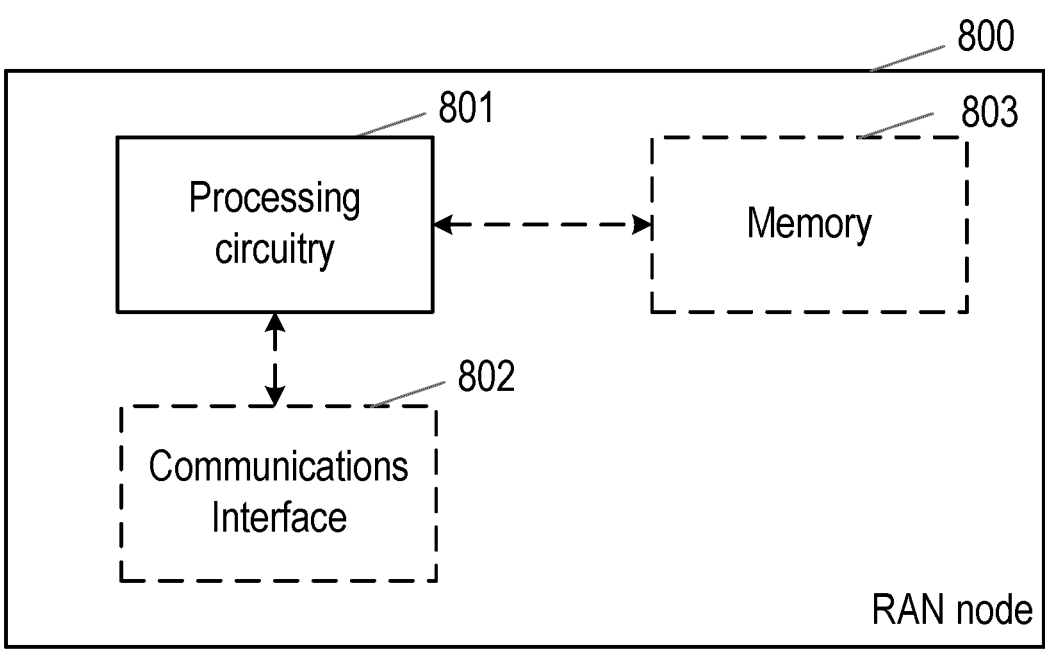
FIG. 8 is a block diagram of a RAN node according to various embodiments.

FIG. 8 is a block diagram of a RAN node 800 according to various embodiments that can be used to implement the techniques described herein. It will be appreciated that the RAN node 800 may comprise one or more virtual machines running different software and/or processes. The RAN node 800 may therefore comprise one or more servers, switches and/or storage devices and/or may comprise cloud computing infrastructure that runs the software and/or processes. In a 5G network the RAN node 800 may be a gNB.

The processing circuitry 801 controls the operation of the RAN node 800 and can implement the methods described herein in relation to the RAN node 800. The processing circuitry 801 can comprise one or more processors, processing units, multi-core processors or modules that are configured or programmed to control the RAN node 800 in the manner described herein. In particular implementations, the processing circuitry 801 can comprise a plurality of software and/or hardware modules that are each configured to perform, or are for performing, individual or multiple steps of the method described herein in relation to the RAN node 800.

In some embodiments, the RAN node 800 may optionally comprise a communications interface 802. The communications interface 802 can be for use in communicating with other nodes, such as other virtual nodes. For example, the communications interface 802 can be configured to transmit to and/or receive from other nodes or network functions requests, resources, information, data, signals, or similar. The processing circuitry 801 may be configured to control the communications interface 802 of the RAN node 800 to transmit to and/or receive from other nodes or network functions requests, resources, information, data, signals, or similar.

Optionally, the RAN node 800 may comprise a memory 803. In some embodiments, the memory 803 can be configured to store program code that can be executed by the processing circuitry 802 to perform the method described herein in relation to the RAN node 800 Alternatively or in addition, the memory 803 can be configured to store any requests, resources, information, data, signals, or similar that are described herein. The processing circuitry 801 may be configured to control the memory 803 to store any requests, resources, information, data, signals, or similar that are described herein.

Figure 9:
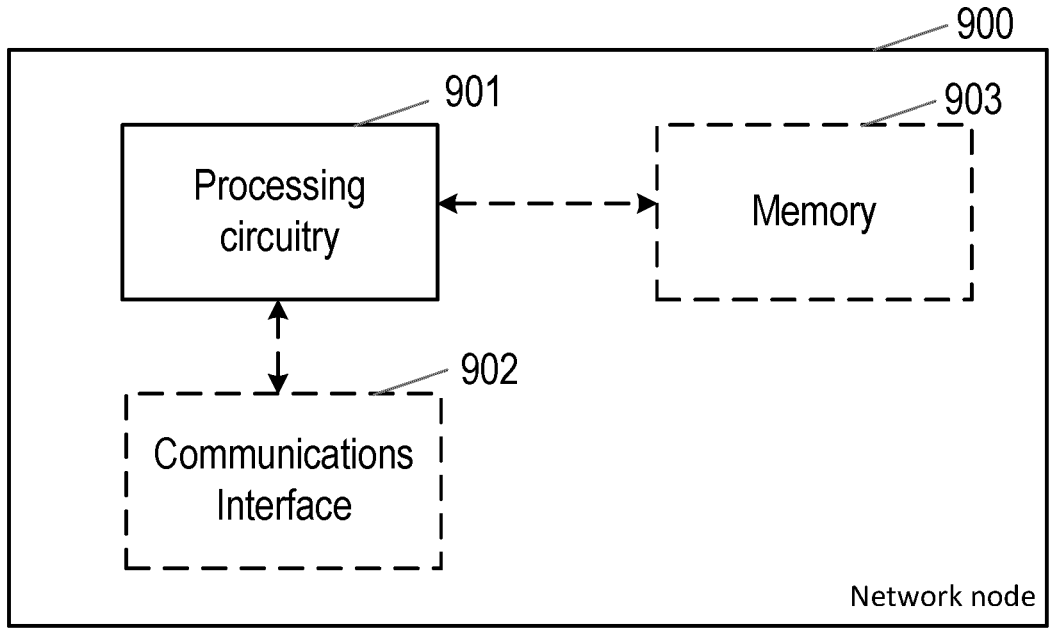
FIG. 9 is a block diagram of a network node according to various embodiments.

FIG. 9 is a block diagram of a network node 900 according to various embodiments that can be used to implement the techniques described herein. It will be appreciated that the network node 900 may comprise one or more virtual machines running different software and/or processes. The network node 900 may therefore comprise one or more servers, switches and/or storage devices and/or may comprise cloud computing infrastructure that runs the software and/or processes. In a 5G network the network node 900 may be a gNB.

The processing circuitry 901 controls the operation of the network node 900 and can implement the methods described herein in relation to the network node 900. The processing circuitry 901 can comprise one or more processors, processing units, multi-core processors or modules that are configured or programmed to control the Network node 900 in the manner described herein. In particular implementations, the processing circuitry 901 can comprise a plurality of software and/or hardware modules that are each configured to perform, or are for performing, individual or multiple steps of the method described herein in relation to the network node 900.

In some embodiments, the network node 900 may optionally comprise a communications interface 902. The communications interface 902 can be for use in communicating with other nodes, such as other virtual nodes. For example, the communications interface 902 can be configured to transmit to and/or receive from other nodes or network functions requests, resources, information, data, signals, or similar. The processing circuitry 901 may be configured to control the communications interface 902 of the network node 900 to transmit to and/or receive from other nodes or network functions requests, resources, information, data, signals, or similar.

Optionally, the network node 900 may comprise a memory 903. In some embodiments, the memory 903 can be configured to store program code that can be executed by the processing circuitry 902 to perform the method described herein in relation to the network node 900 Alternatively or in addition, the memory 903 can be configured to store any requests, resources, information, data, signals, or similar that are described herein. The processing circuitry 901 may be configured to control the memory 903 to store any requests, resources, information, data, signals, or similar that are described herein.

Figure 10:
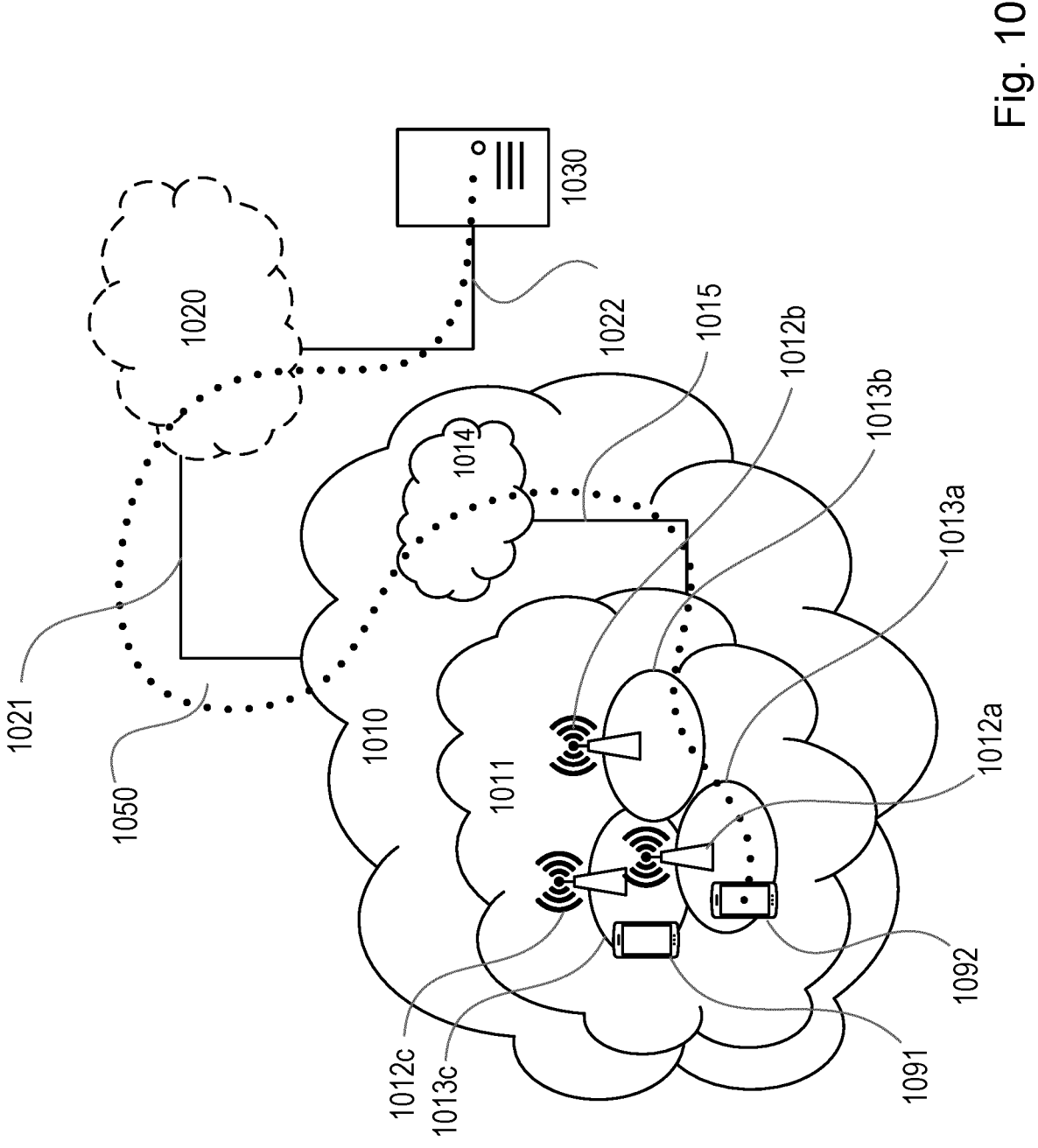
FIG. 10 shows a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signalling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
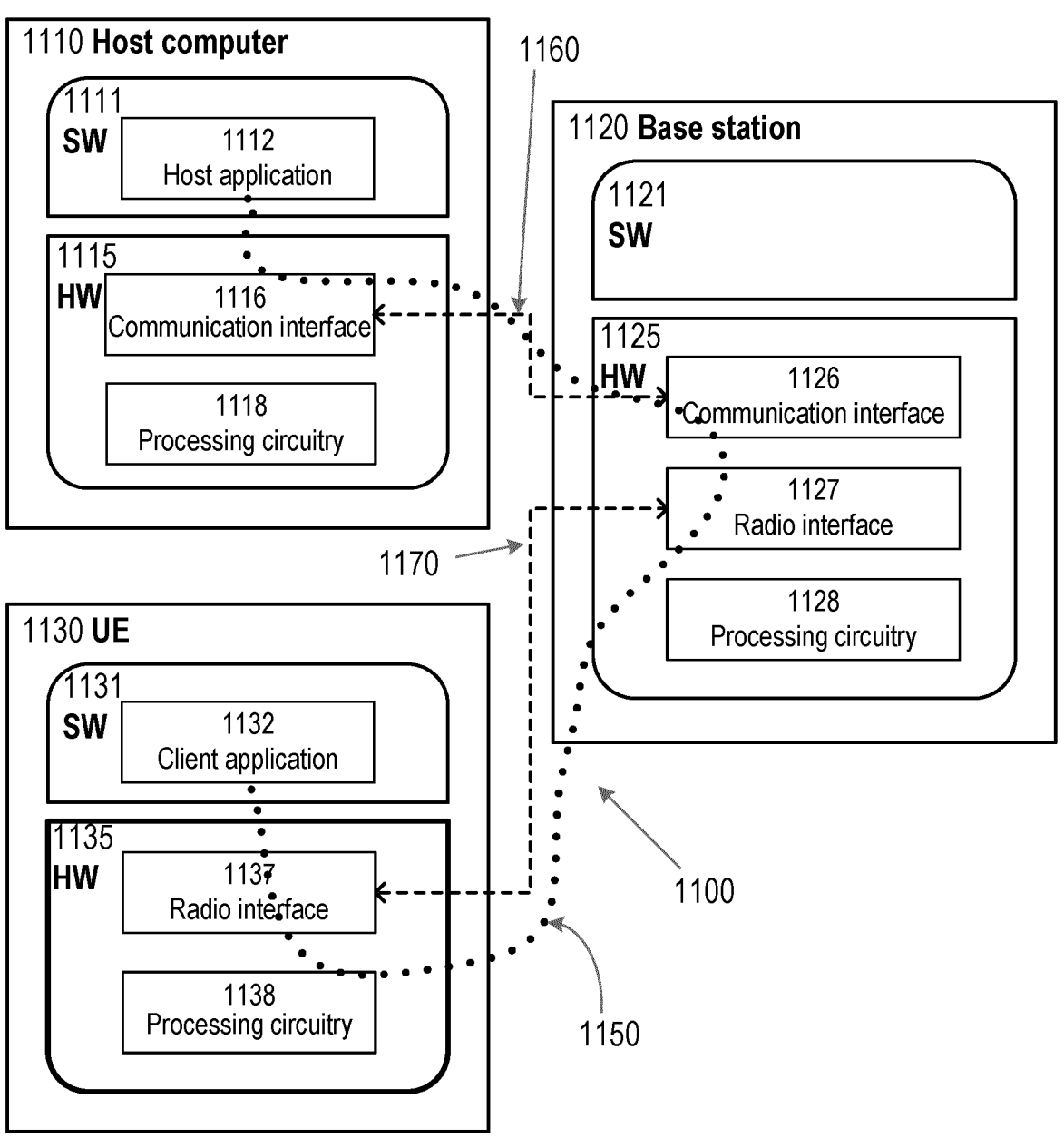
FIG. 11 shows a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the quality of the coverage provided by the base station 1120 since the beam is configured according to the expected speed of movement of the UE 1130 in that part of the cell.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signalling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
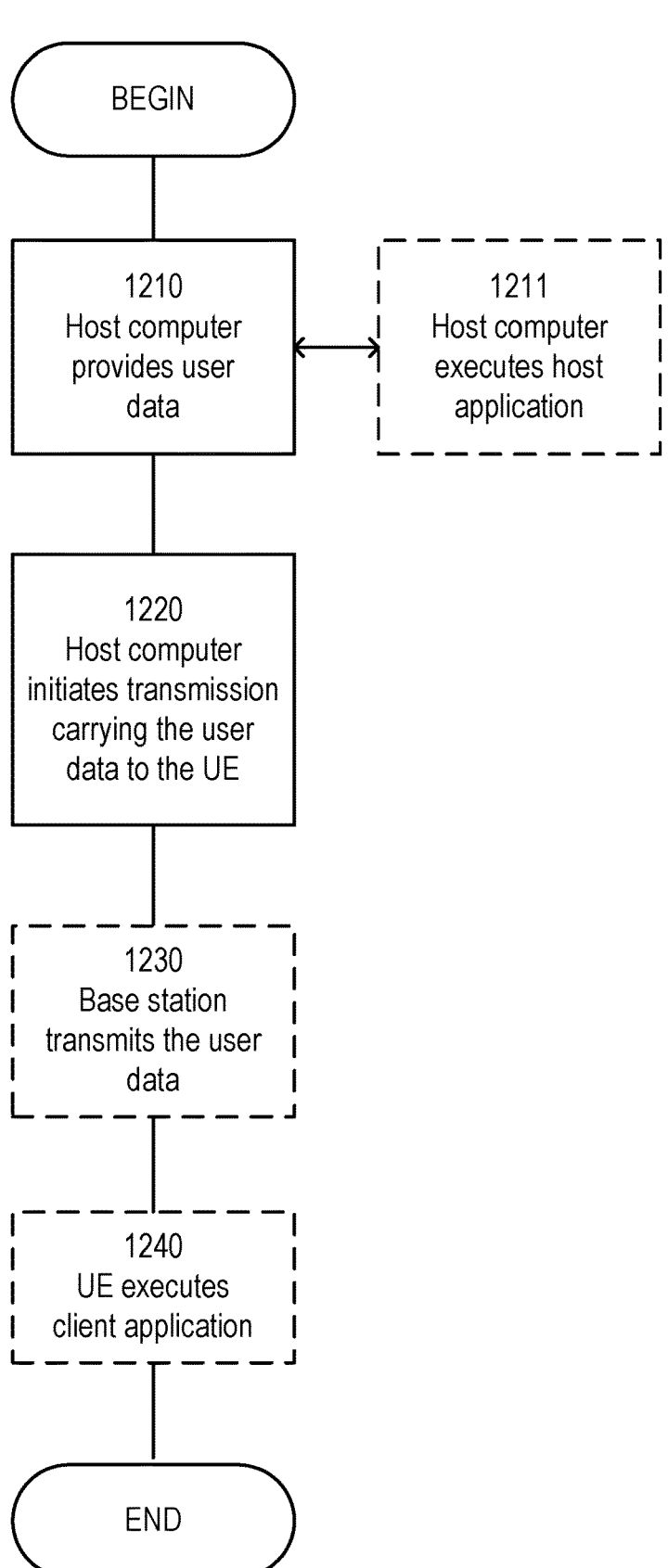
FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
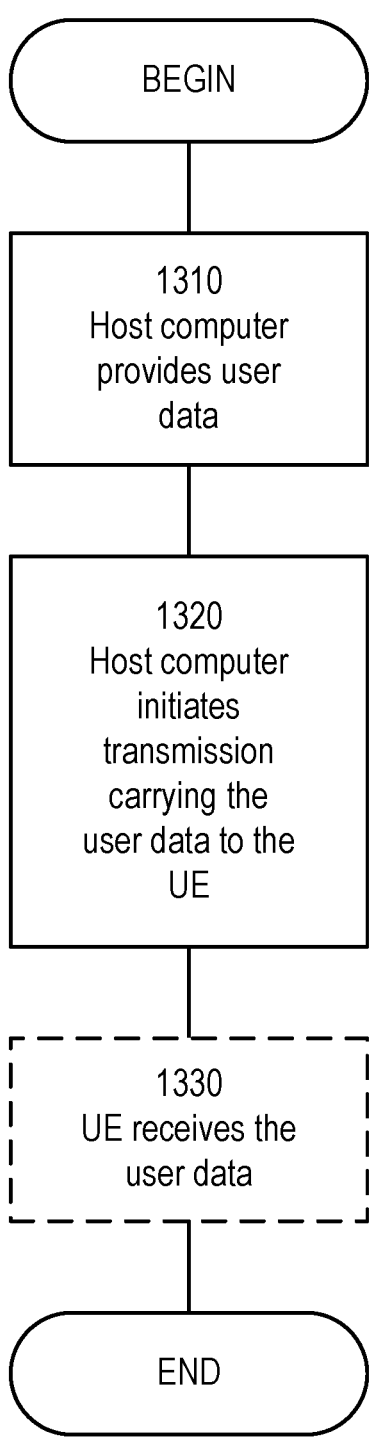
FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
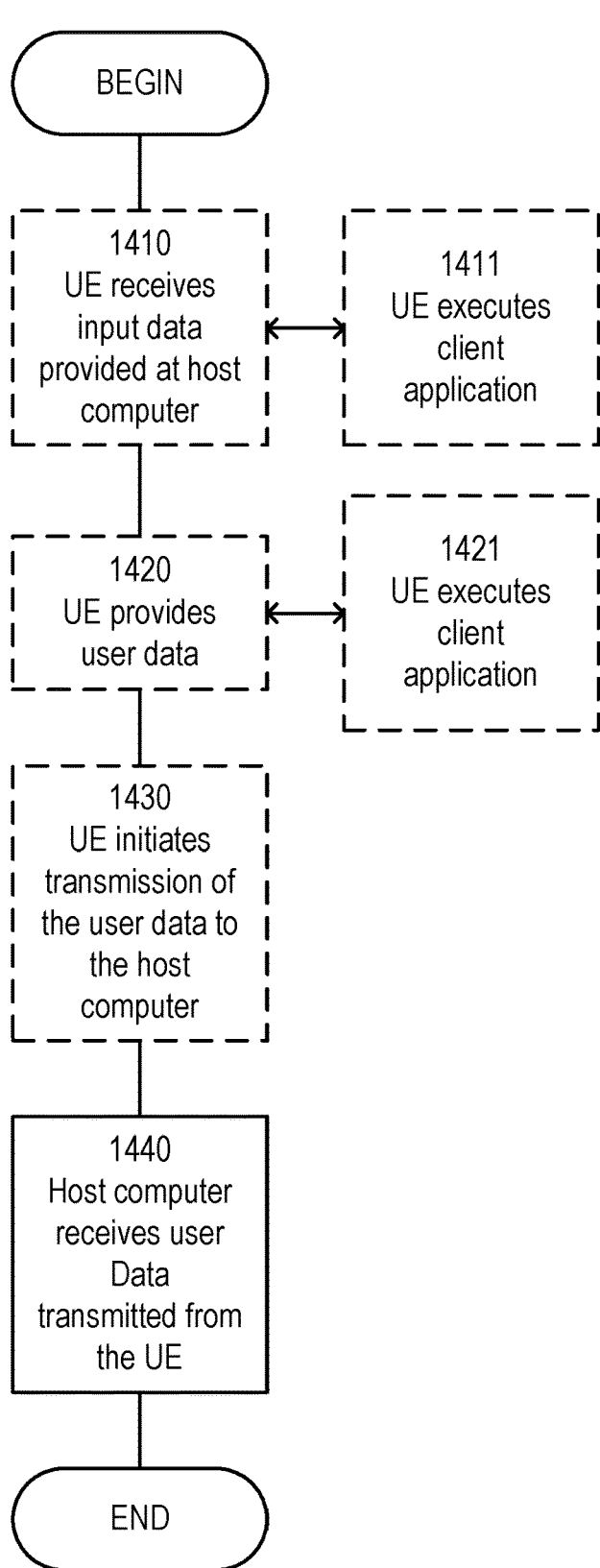
FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
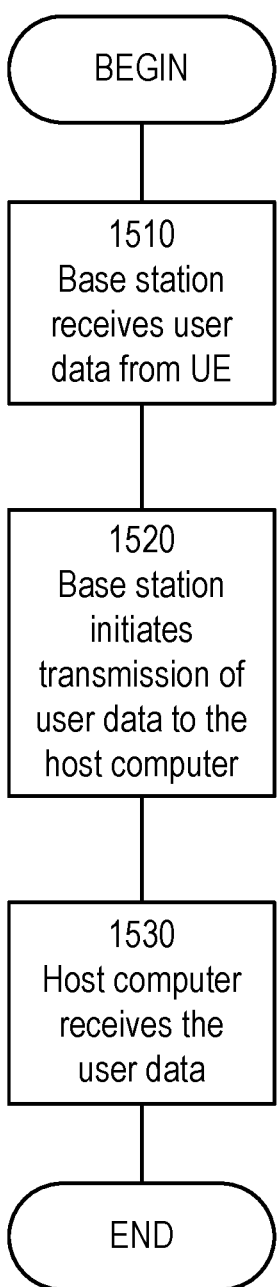
FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method of operating a first radio access network (RAN) node in a communication network, the first RAN node configured to serve a plurality of regions of a first cell with respective beams, the method comprising:
   providing, to a wireless device when entering a region of the first cell, a region-specific beam configuration for each of the beams, wherein the region-specific beam configuration for a beam is set according to an expected speed of movement of wireless devices in said region, wherein the expected speed of movement of wireless devices in said region is determined prior to providing the region-specific beam configuration to the wireless device entering the region of the first cell.

2. The method as claimed in claim 1, wherein the method further comprises:
   receiving behavior data relating to behavior of a first wireless device in the first cell, wherein the behavior data comprises information on previous speed of movement of the first wireless device in one or more regions of the first cell;
   comparing the received information on previous speed of movement of the first wireless device for each of the one or more regions to the expected speed of movement for each of the one or more regions; and
   if the previous speed of movement of the first wireless device in a region deviated from the expected speed of movement for that region, storing an indication of the previous speed of movement of the first wireless device in that region.

3. The method as claimed in claim 2, wherein the method further comprises:
   when the first wireless device is subsequently in a first region of the first cell for which an indication is stored, retrieving the stored indication of the previous speed of movement of the first wireless device in the first region; and
   providing a User Equipment-specific beam configuration for the first wireless device in the first region, wherein the User Equipment-specific beam configuration is set according to the previous speed of movement of the first wireless device in the first region.

4. The method as claimed in claim 1, wherein the method further comprises:
   at, or during, handover of a first wireless device from a second RAN node to the first RAN node, receiving information from the second RAN node indicating a suitable beam configuration for the first wireless device.

5. The method as claimed in claim 1, wherein the method further comprises:
   at, or during, handover of a second wireless device from the first RAN node to a second RAN node, sending information to the second RAN node indicating a suitable beam configuration for the second wireless device.

6. The method as claimed in claim 1, wherein the method further comprises:
   receiving data relating to wireless devices in the first cell, wherein the data comprises, for each wireless device, measurements by the wireless device of one or more beams of the first cell at a plurality of time instants;
   analyzing the received data to estimate respective speeds of movement of the wireless devices in the first cell based on the measurements of the one or more beams and the time instants at which the measurements were made;
   analyzing the respective estimated speeds of movement of the wireless devices in the first cell to determine an expected speed of movement of wireless devices in each region of the first cell; and
   setting region-specific beam configurations for each of the regions, wherein the region-specific beam configuration for a region is set according to the expected speed of movement of wireless devices in that region.

7. The method as claimed in claim 1, wherein the method further comprises one or both of:
   transmitting user data provided by a host computer to a first wireless device that is in a first region of the first cell using a beam configuration specific to the first region; and
   receiving user data from a second wireless device that is in a second region of the first cell using a beam configuration specific to the second region.

8. A method of operating a network node to determine respective region-specific beam configurations for a first radio access network (RAN) node in a communication network, wherein the first RAN node is configured to serve a plurality of regions of a first cell with respective beams, the method comprising:
   receiving data relating to wireless devices in the first cell, wherein the data comprises, for each wireless device, measurements by the wireless device of one or more beams of the first cell at a plurality of time instants;
   analyzing the received data to estimate respective speeds of movement of the wireless devices in the first cell based on the measurements of the one or more beams and the time instants at which the measurements were made by each respective wireless device;

analyzing the respective estimated speeds of movement of the wireless devices in the first cell to determine an expected speed of movement of wireless devices in each region of the first cell; and setting a region-specific beam configuration for each of the regions, wherein the region-specific beam configuration for a region is set according to the expected speed of movement of wireless devices in that region, wherein the region-specific beam configuration for each of the regions is provided, by the RAN node, to a wireless device entering a region of the first cell, wherein the determining of the region-specific beam configuration is performed prior to providing the region-specific beam configuration for each of the regions by the RAN node, to a wireless device entering a region of the first cell.

9. A first radio access network (RAN) node for use in a communication network, the first RAN node configured to serve a plurality of regions of a first cell with respective beams, the first RAN node comprising a processor and a memory, said memory containing instructions executable by said processor whereby said first RAN node is operative to:

provide, to a wireless device when entering a region of the first cell, a region-specific beam configuration for each of the beams, wherein the region-specific beam configuration for a beam is set according to an expected speed of movement of wireless devices in said region, wherein the expected speed of movement of wireless devices in said region are determined prior to providing the region-specific beam configuration is provided to the wireless device entering the region of the first cell.

10. The first RAN node as claimed in claim 9, wherein the first RAN node is further operative to:

receive behavior data relating to behavior of a first wireless device in the first cell, wherein the behavior data comprises information on previous speed of movement of the first wireless device in one or more regions of the first cell;

compare the received information on previous speed of movement of the first wireless device for each of the one or more regions to the expected speed of movement for each of the one or more regions; and store an indication of the previous speed of movement of the first wireless device in a region if the previous speed of movement of the first wireless device in that region deviated from the expected speed of movement for that region.

11. The first RAN node as claimed in claim 10, wherein the first RAN node is further operative to:

when the first wireless device is subsequently in a first region of the first cell for which an indication is stored, retrieve the stored indication of the previous speed of movement of the first wireless device in the first region; and provide a User Equipment-specific beam configuration for the first wireless device in the first region, wherein the User Equipment-specific beam configuration is set according to the previous speed of movement of the first wireless device in the first region.

12. The first RAN node as claimed in claim 9, wherein first RAN node is further operative to:

at, or during, handover of a first wireless device from a second RAN node to the first RAN node, receive information from the second RAN node indicating a suitable beam configuration for the first wireless device.

13. The first RAN node as claimed in claim 9, wherein the first RAN node is further operative to:

at, or during, handover of a second wireless device from the first RAN node to a second RAN node, send information to the second RAN node indicating a suitable beam configuration for the second wireless device.

14. The first RAN node as claimed in claim 9, wherein the first RAN node is further operative to:

receive data relating to wireless devices in the first cell, wherein the data comprises, for each wireless device, measurements by the wireless device of one or more beams of the first cell at a plurality of time instants;

analyze the received data to estimate respective speeds of movement of the wireless devices in the first cell based on the measurements of the one or more beams and the time instants at which the measurements were made;

analyze the respective estimated speeds of movement of the wireless devices in the first cell to determine an expected speed of movement of wireless devices in each region of the first cell; and set region-specific beam configurations for each of the regions, wherein the region-specific beam configuration for a region is set according to the expected speed of movement of wireless devices in that region.

15. The first RAN node as claimed in claim 9, wherein the first RAN node is operative to analyze the received data by analyzing the received data to estimate the respective speeds of movement of the wireless devices in the first cell based on the measurements of the one or more beams, the time instants at which the measurements were made, and mapping information indicating a geographical location associated with each beam.

16. The first RAN node as claimed in claim 9, wherein the first RAN node is operative to analyze the received data by analyzing the received data to estimate the respective speeds of movement of the wireless devices in the first cell based on the measurements of the one or more beams, the time instants at which the measurements were made, information indicating a distance of each wireless device from the first RAN node at the time instants at which the measurements were made and information indicative of the size and/or relative locations of the respective regions.

17. The first RAN node as claimed in claim 9, wherein the first RAN node is further operative to at least one of:

transmit user data provided by a host computer to a first wireless device that is in a first region of the first cell using a beam configuration specific to the first region; and receive user data from a second wireless device that is in a second region of the first cell using a beam configuration specific to the second region.

18. A network node for use in determining respective region-specific beam configurations for a first radio access network (RAN) node in a communication network, wherein the first RAN node is configured to serve a plurality of regions of a first cell with respective beams, wherein the network node comprises a processor and a memory, said memory containing instructions executable by said processor whereby said network node is operative to:

receive data relating to wireless devices in the first cell, wherein the data comprises, for each wireless device, measurements by the wireless device of one or more beams of the first cell at a plurality of time instants;

analyze the received data to estimate respective speeds of movement of the wireless devices in the first cell based on the measurements of the one or more beams and the time instants at which the measurements were made;

analyze the respective estimated speeds of movement of the wireless devices in the first cell to determine an expected speed of movement of wireless devices in each region of the first cell; and set a region-specific beam configuration for each of the regions, wherein the region-specific beam configuration for a region is set according to the expected speed of movement of wireless devices in that region, wherein the region-specific beam configuration for each of the regions is provided, by the RAN node, to a wireless device entering a region of the first cell, wherein the determining respective region-specific beam configuration is performed prior to providing the region-specific beam configuration for each of the regions by the RAN node, to a wireless device entering a region of the first cell.

19. The network node as claimed in claim 18, wherein the network node is operative to analyze the received data by analyzing the received data to estimate the respective speeds of movement of the wireless devices in the first cell based on the measurements of the one or more beams, the time instants at which the measurements were made, and mapping information indicating a geographical location associated with each beam.

20. The network node as claimed in claim 18, wherein the network node is operative to analyze the received data by analyzing the received data to estimate the respective speeds of movement of the wireless devices in the first cell based on the measurements of the one or more beams, the time instants at which the measurements were made, information indicating a distance of each wireless device from the first RAN node at the time instants at which the measurements were made and information indicative of the size and/or relative locations of the respective regions.

* * * * *